US010075492B2

(12) United States Patent
Kawakubo

(10) Patent No.: US 10,075,492 B2
(45) Date of Patent: Sep. 11, 2018

(54) TERMINAL APPARATUS, SCREEN SHARING METHOD, PROGRAM, AND SCREEN SHARING SYSTEM

(71) Applicant: Tomoko Kawakubo, Tokyo (JP)

(72) Inventor: Tomoko Kawakubo, Tokyo (JP)

(73) Assignee: Ricoh Company, Tokyo (JP)

(*) Notice: Subject to any disclaimer, the term of this patent is extended or adjusted under 35 U.S.C. 154(b) by 241 days.

(21) Appl. No.: 14/833,239

(22) Filed: Aug. 24, 2015

(65) Prior Publication Data

US 2016/0065633 A1 Mar. 3, 2016

(30) Foreign Application Priority Data

Aug. 26, 2014 (JP) .................................. 2014-171229

(51) Int. Cl.
*G06F 3/00* (2006.01)
*H04L 29/06* (2006.01)
*H04N 21/431* (2011.01)
*H04N 21/4788* (2011.01)

(52) U.S. Cl.
CPC ..... *H04L 65/4038* (2013.01); *H04N 21/4316* (2013.01); *H04N 21/4788* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,654,785 B1* | 11/2003 | Craig | ............... | G06F 17/30873 707/999.001 |
| 7,716,273 B2* | 5/2010 | Soin | ...................... | H04W 4/001 709/203 |
| 8,743,022 B2 | 6/2014 | Masuda et al. | | |
| 9,092,533 B1* | 7/2015 | Demathieu | ........ | G06F 17/30884 |
| 9,098,230 B2 | 8/2015 | Masuda et al. | | |
| 9,165,281 B2* | 10/2015 | Orsolini | ................. | G06Q 10/10 |
| 9,274,692 B2* | 3/2016 | Yang | ................... | G06F 3/04842 |
| 2004/0267746 A1* | 12/2004 | Marcjan | ............. | G06F 21/6218 |
| 2005/0102360 A1* | 5/2005 | Chavis | ................... | G06F 9/4443 709/205 |
| 2006/0075348 A1* | 4/2006 | Xu | ......................... | G06F 3/0481 715/730 |
| 2006/0150108 A1* | 7/2006 | Adachi | .................... | G09G 5/14 715/750 |

(Continued)

FOREIGN PATENT DOCUMENTS

JP 2012-108872 6/2012

*Primary Examiner* — Hien L Duong
(74) *Attorney, Agent, or Firm* — IPUSA, PLLC

(57) ABSTRACT

A terminal apparatus that shares a view screen of information and a material screen associated with the information with another terminal apparatus includes an operation receiving unit configured to receive an operation of the view screen or the material screen from a user; and a display control unit configured to control a switching display of switching the view screen or the material screen so as to share a screen with the another terminal apparatus based on the operation of the view screen or the material screen when the user has an authority, wherein the display control unit controls to display the view screen without sharing the screen with the another terminal apparatus for a part of the operation of the view screen, regardless of whether the user has the authority.

17 Claims, 15 Drawing Sheets

(56) References Cited

U.S. PATENT DOCUMENTS

| | | | | |
|---|---|---|---|---|
| 2009/0172101 A1* | 7/2009 | Arthursson | ............ | G06F 3/0486 709/205 |
| 2010/0131868 A1* | 5/2010 | Chawla | ................... | G06F 3/044 715/759 |
| 2010/0174773 A1* | 7/2010 | Penner | ................... | G06Q 10/10 709/203 |
| 2010/0262925 A1* | 10/2010 | Liu | ........................ | G06Q 10/10 715/759 |
| 2011/0029915 A1* | 2/2011 | Harris | ................... | G06F 3/1423 715/781 |
| 2012/0226997 A1* | 9/2012 | Pang | ................... | H04L 65/4038 715/753 |
| 2013/0073965 A1* | 3/2013 | Sik | ........................ | G06F 17/241 715/730 |
| 2013/0110925 A1* | 5/2013 | Wessling | .............. | G06Q 10/109 709/204 |
| 2013/0212490 A1* | 8/2013 | Scherpa | ................ | G06Q 10/101 715/753 |
| 2014/0173491 A1 | 6/2014 | Kawakubo et al. | | |
| 2015/0026595 A1* | 1/2015 | Lu | ........................ | H04L 65/403 715/753 |
| 2015/0128069 A1* | 5/2015 | Ouyang | ................ | H04L 65/605 715/753 |

\* cited by examiner

FIG.5

| MEETING ID | MEETING NAME | OPEN TIME | MEETING STATE | WHETHER AGENDA EXIST OR NOT | ... |
|---|---|---|---|---|---|
| 111 | ○○○○ | △△△△ | BEFORE OPEN | NOT EXIST | ... |
| 222 | ○○○○○ | △△△△△ | BEFORE OPEN | EXIST | ... |
| ... | ... | ... | ... | ... | ... |

FIG.6

| AGENDA ID | MEETING ID | AGENDA NAME | PRESENTER | PRESENTATION TIME | ... |
|---|---|---|---|---|---|
| AAA | 222 | ○○○○○○ | ×××× | □□□ | ... |
| BBB | 222 | ○○○ | ×××××× | ■■■ | ... |
| ... | ... | ... | ... | ... | ... |

FIG.7

| MATERIAL ID | AGENDA ID | MEETING ID | MATERIAL NAME | STORING LOCATION | ... |
|---|---|---|---|---|---|
| α | AAA | 222 | ☆☆☆ | ◇◇◇◇ | ... |
| β | AAA | 222 | ☆☆ | ◇ | ... |
| γ | | 111 | ★★★ | ◆◆◆◆ | ... |
| ... | ... | | | ... | ... |

FIG.8

```
MEETING VIEW  ×
← → C ⇧ | 0000                                          ☆  □  ⭐ ⊠  ≡
┌─────────────────────────────────────────────────────────────┐ ~1000
│ MEETING ADMINISTRATION/MEETING VIEW                          │
│                                                              │
│ ● YOU CAN SEARCH MEETING SATISFYING DESIGNATED CONDITION     │
│ SEARCH CONDITION                                             │
│                                                              │
│ MEETING ID,    [           ]                                 │
│ MEETING NAME                                                 │
│ OPEN TIME      [           ]  PREVIOUS DAY | NEXT DAY        │
│                                                              │
│ MEETING STATE  ⦿ ALL  ○ ONGOING  ○ NOT YET    ○ CANNOT BE    │
│                                        OPENED       OPENED   │
│                                                              │
│ SEARCH RESULT                                                │
│                                                MEETING       │
│ MEETING ID  MEETING NAME           OPEN TIME   STATE         │
│ M01  BOARD MEETING                 2013/10/10 13:00  ONGOING │
│ M02  COMMERCIAL PRODUCT A SALES    2013/10/10 14:00  BEFORE  │
│      ADMISSION MEETING                                OPEN   │
│ M03  COMMERCIAL PRODUCT B PERSON   2013/10/12 09:30  BEFORE  │
│      IN CHARGE MONTHLY MEETING                        OPEN   │
│ M04  BUSINESS DIVISION T POLICY    2013/10/25 15:00  BEFORE  │
│      EXPLANATORY MEETING                              OPEN   │
│  :    :                              :                 :     │
│  :    :                              :                 :     │
│  :    :                              :                 :     │
│                                                              │
│ [DETAILED ] [PARTICIPATION]  ◁ PREVIOUS 10  1-8/8  NEXT 10 ▷ │
│  MEETING                                                     │
│          1001                                                │
└──────────────────────────────────────────────────────────────┘
```

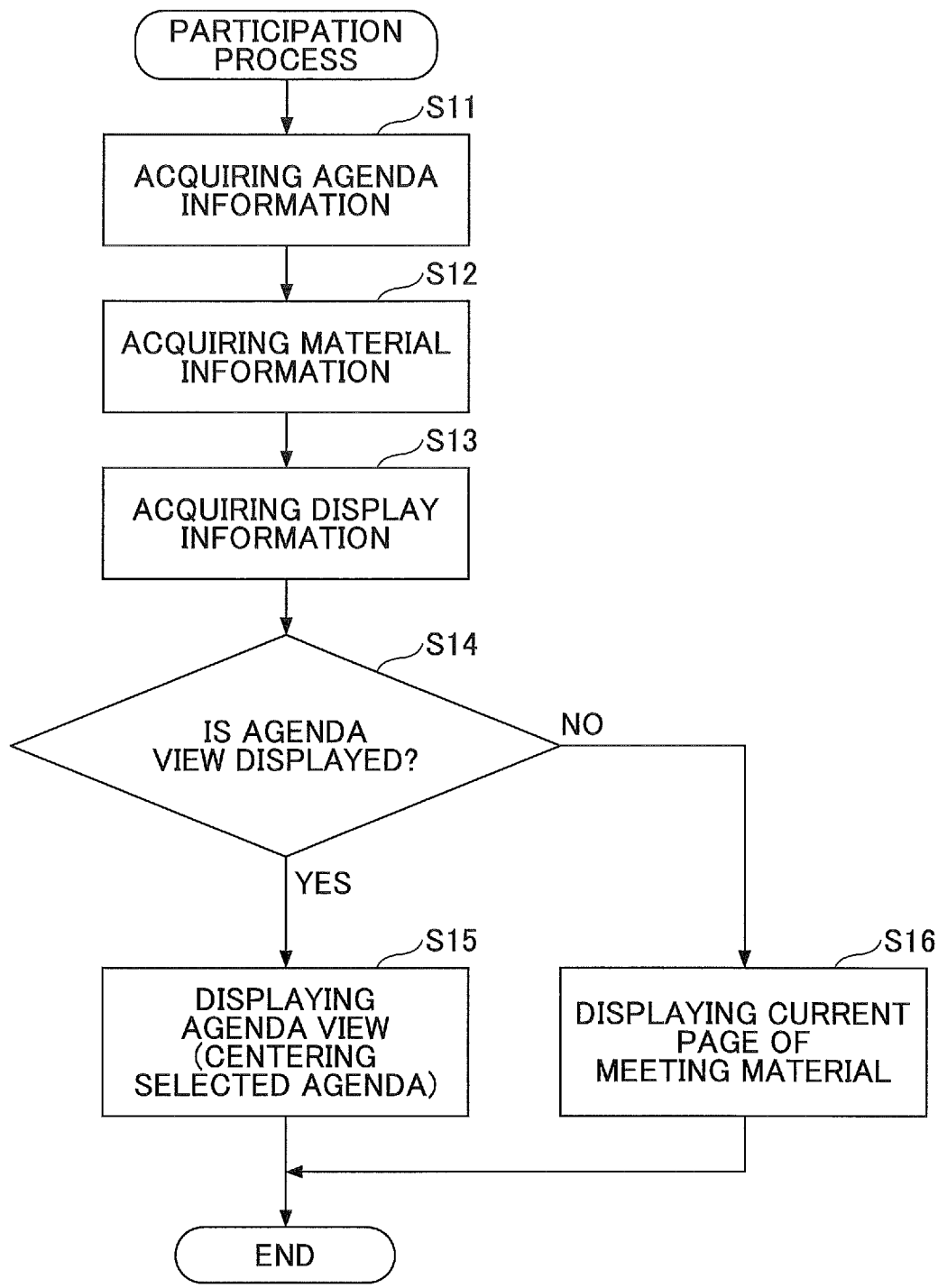

FIG.16
(A)
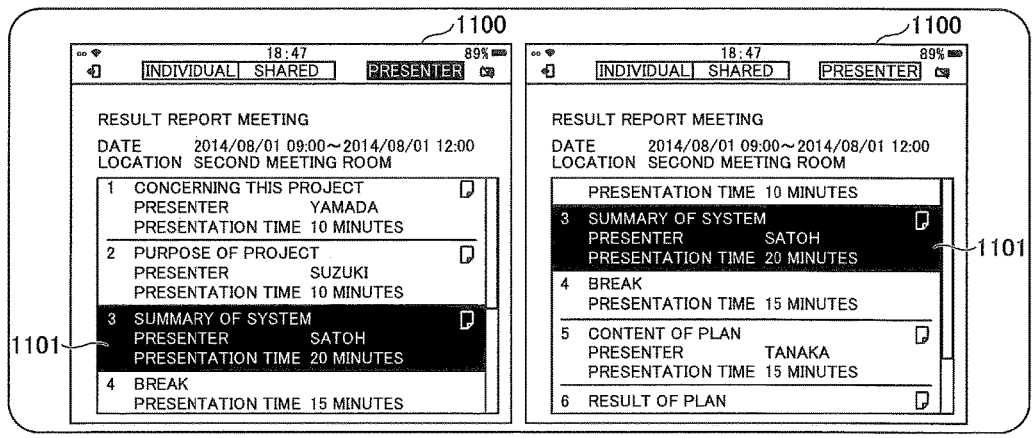
PRESENTER SELECTS
AGENDA WITH MATERIAL
(B)
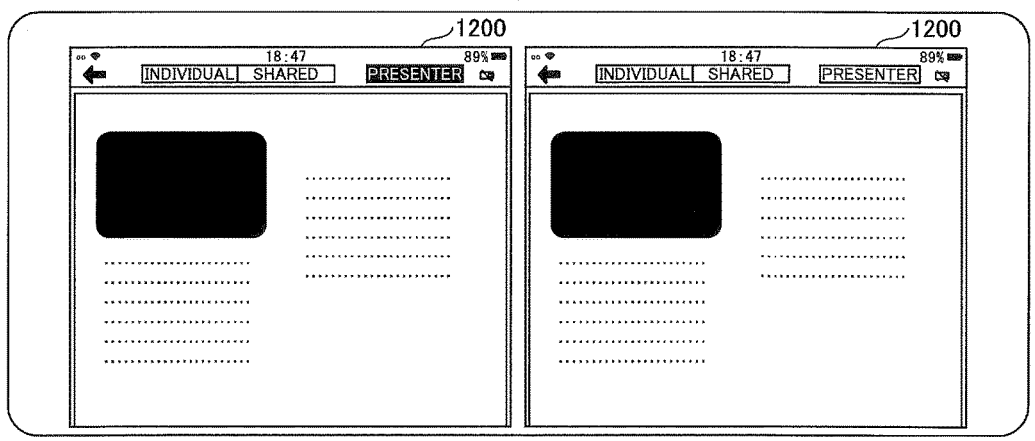
PRESENTER RETURNS
TO AGENDA VIEW
(C)
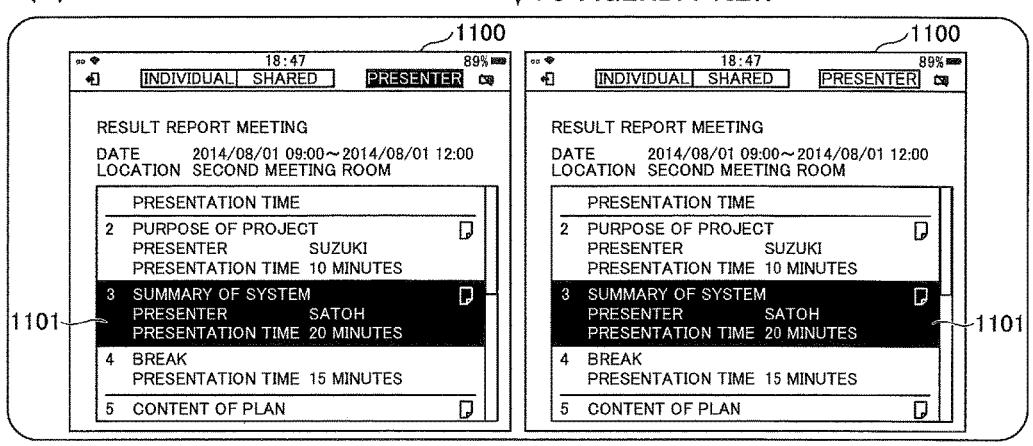

FIG.17

| TIMING OF SCROLLING AGENDA VIEW OF PARTICIPANT |
|---|
| CASE WHERE AGENDA VIEW IS DISPLAYED AT TIME OF PARTICIPATING MEETING |
| CASE WHERE AGENDA VIEW IS DISPLAYED IN SHARED MODE AT TIME OF SWITCHING FROM UNSHARED MODE TO SHARED MODE |
| CASE WHERE AGENDA VIEW IS DISPLAYED AT TIME OF ACQUIRING PRESENTER |
| CASE WHERE TRANSITING FROM DIFFERENT SCREEN TO AGENDA VIEW (RETURNING FROM MATERIAL SCREEN AND SETUP SCREEN TO VIEW) |

… 
TERMINAL APPARATUS, SCREEN SHARING METHOD, PROGRAM, AND SCREEN SHARING SYSTEM

BACKGROUND OF THE INVENTION

1. Field of the Invention

The present invention relates to a terminal apparatus, a screen sharing method, a program, and a screen sharing system.

2. Description of the Related Art

An example of a screen sharing service providing system of sharing a display screen, in which an input operation is effected, by sending and receiving data of a small data amount, Between information processing apparatuses, on which the same content is displayed on screens of the information processing apparatus, in the example of the screen sharing service providing system, the information processing apparatus having an operation right sends operation information corresponding to an input operation to another information processing apparatus. Further, the input operation on the sending side is reproduced on the screen of the other information processing apparatus in conformity with the received operation information (see Patent Document 1).

Patent Document 1: Japanese Laid-Open Patent Publication No. 2012-108872

SUMMARY OF THE INVENTION

It is a general object of at least one embodiment of the present invention to provide a terminal apparatus that substantially obviates one or more problems caused by the limitations and disadvantages of the related art.

One aspect of the embodiments of the present invention may be to provide a terminal apparatus that shares a view screen of information and a material screen associated with the information with another terminal apparatus including an operation receiving unit configured to receive an operation of the view screen or the material screen from a user; and a display control unit configured to control a switching display of switching the view screen or the material screen so as to share a screen with the another terminal apparatus based on the operation of the view screen or the material screen when the user has an authority, wherein the display control unit controls to display the view screen without sharing the screen with the another terminal apparatus for a part of the operation of the view screen, regardless of whether the user has the authority.

BRIEF DESCRIPTION OF THE DRAWINGS

FIG. 5 illustrates an exemplary structure of a meeting information table.

FIG. 6 illustrates an exemplary structure of an agenda information table.

FIG. 7 illustrates an exemplary structure of a material information table.

FIG. 8 is an exemplary image chart of a meeting participation screen.

FIG. 9 is an exemplary flowchart of a meeting participation process.

FIG. 16 explains an exemplary display synchronization in an agenda view screen.

FIG. 17 explains an exemplary case where selected states of an agenda and scrolls (positions) of agenda view screens synchronize.

DETAILED DESCRIPTION OF THE PREFERRED EMBODIMENTS

In a screen sharing system including multiple terminal apparatuses performing screen sharing, a view screen of information displayed in a terminal apparatus of a user who has an authority of a presenter or the like is synchronously displayed in a terminal apparatus of a user without the authority such as a participant.

In this example of the screen sharing system, in a case where a user with the authority or a user without the authority do not wish to a synchronous display of an operation onto a view screen of information, the user can select an unshared mode without performing the synchronous display to thereby enable an individual operation into the view screen of the information.

A description is given below, with reference to the FIG. 1 through FIG. 17 of embodiments of the present invention. Where the same reference symbols are attached to the same parts, repeated description of the parts is omitted.

Reference symbols typically designate as follows:

1: meeting system;
10: meeting server;
12: client terminal;
21: sending and receiving control unit;
22: information process unit;
23: information administration unit;
31: information provision unit;
32: meeting control unit;
41: UI display unit;
42: sending and receiving control unit;
43: information process unit;
51: display control unit;
52: input operation control unit;
61: information acquisition request unit;
62: meeting process unit;
100: computer;
101: input device;
102: display device;
103: external I/F;
103a: recording medium;
104: random access memory (RAM);
105: read only memory (ROM);
106: central processing unit (CPU);
107: communication I/F;

108: hard disk drive (HDD);
B: bus; and
N1: network.

Embodiments of the present invention is described in detail below. Within this embodiment, a meeting system 1 is described as an exemplary screen sharing system. However, the screen sharing system is not limited to the meeting system 1.

First Embodiment

<System Structure>

Figure 1:
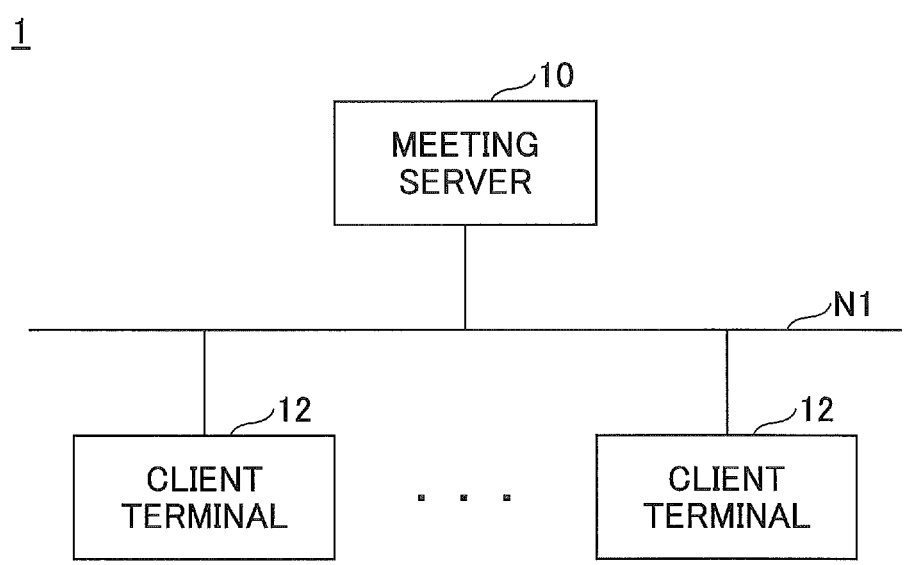
FIG. 1 illustrates an exemplary structure of a meeting system of an embodiment.

FIG. 1 illustrates an exemplary structure of a meeting system of the embodiment. In the meeting system 1 illustrated in FIG. 1, a meeting server 10 and multiple client terminals 12 are connected with a network N1 such as a local area network (LAN), for example.

The meeting server 10 receives a registration request of requesting a meeting, a registration request of requesting an agenda, and a registration request of requesting a meeting, and stores meeting information, agenda information, and material information described below. Further, the meeting server 10 performs an open of a meeting, a control for participation, and so on. The meeting server 10 is substantialized by software and a service, which are operated in at least one computer. The meeting server 10 may work in a mode of, so-called, a cloud service. For example, the meeting server 10 is substantialized by a dedicated apparatus for the meeting system 1 or an information processing apparatus such as an ordinary workstation or an ordinary personal computer.

The client terminal 12 has a function of registering meeting information, agenda information, and material information into the meeting server 10 and a function of displaying views of meetings and agendas (a meeting view and an agenda view) and materials. The client terminal 12 may limit a function which can be used depending on a user's authority. For example, the client terminal 12 may disable a user without having a registration authority of, for example, meeting information or agenda information from using a registration function of the meeting information or the agenda information.

The client terminal 12 may be a terminal apparatus such as a PC, a tablet terminal, a smartphone, a mobile phone, a PDA, or the like, a virtual machine, a projector, an electronic blackboard, or a dedicated apparatus for the meeting system 1. An application operated in the client terminal 12 may be a native application, a web browser, or a web application operated in the web browser.

Further, the client terminal 12 has functions of acquiring meeting information, agenda information, and material information from the meeting server 10, downloading the material data, and participating in the meeting. In the meeting system 1, all the users participating in the meeting can be a presenter.

While the meeting is ongoing, the client terminal 12 displays the agenda view and the material. While the client terminal 12 is participating in the meeting, the same material as that in the other client terminal 12 is displayed. The client terminal 12 receives an input operation (e.g., turning a page), which is performed by the presenter or the like in the other client terminal 12, from the meeting server 10 in real time. Thus, a display screen can be shared with the other client terminal 12.

For example, when the page of the material is turned in the client terminal 12 of the presenter, the page of the material is turned in the client terminal 12 of other than the presenter so that the same screen is shared. In a manner similar thereto, when the agenda view is displayed in the client terminal 12 of the presenter, the agenda view is displayed in the client terminal 12 of other than the presenter (e.g., the client terminal 12 of other than the participant). Thus, the screens of the client terminals 12 participating in the meeting synchronize.

Further, a mark or a line is drawn or a handwritten memo of adding a character is described by a touch pen or a mouse, the mark, the line, or the handwritten memo is reflected (appears) on the screen of the client terminal 12 of the participant.

In the meeting system 1, the meeting server 10 and the client terminal 12 can perform data communications through the network N1. The network N1 can be formed by a wired or wireless LAN, the Internet, or a wired or wireless dedicated line.

<Hardware Structure>

Figure 2:
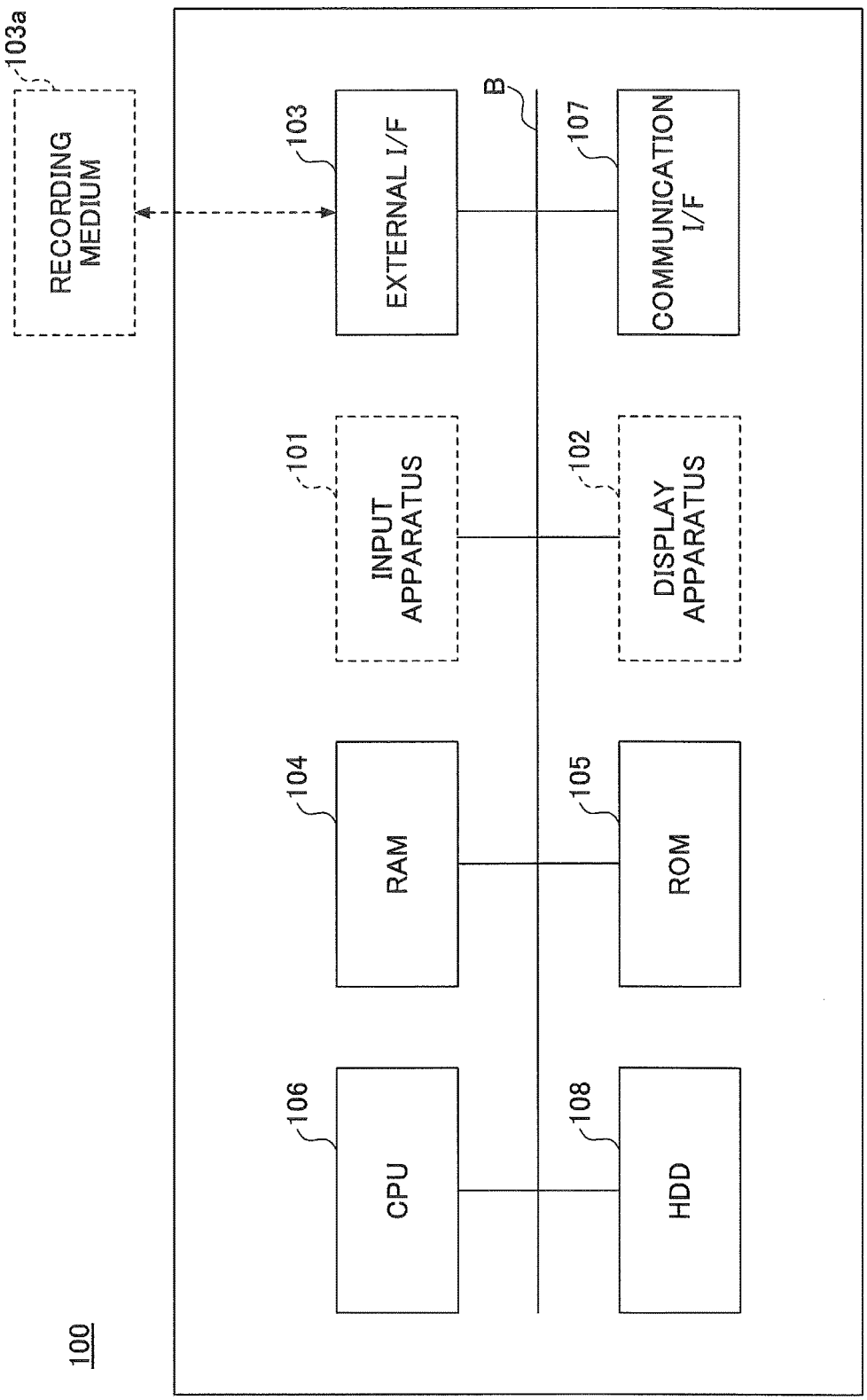
FIG. 2 illustrates an exemplary hardware structure of a computer of the embodiment.

The meeting server 10 and the client terminal 12 are substantialized (implemented) by the computer 100 having a hardware structure illustrated in, for example, FIG. 2. FIG. 2 illustrates an exemplary hardware structure of a computer of the embodiment.

Referring to FIG. 2, the computer 100 includes an input device 101, a display device 102, an external I/F 103, a RAM 104, a ROM 105, a CPU 106, a communication I/F 107, a HDD 108, and so on, mutually connected by a bus B. It is acceptable to structure such that the input device 101 and the display device 102 are connected when necessary.

The input device 101 includes a keyboard, a mouse, a touch panel, and the like, by which a user can input various operation signals. The display device 102 includes a display or the like to display a processing result obtained by the computer 100.

The communication I/F 107 is an interface provided to connect the computer 100 with various networks. Thus, the computer 100 can perform data communications through the communication I/F 107.

The HDD 108 is an exemplary non-volatile memory device that stores a program and data. The stored program and data are an operating system (OS), which is basic software controlling the entire computer 100, application software (hereinafter, simply referred to as an "application") providing various functions in the OS, and so on. The computer 100 may use a drive device using a flash memory (e.g., a solid state drive (SSD)) as a memory medium in place of the HDD 108.

The external I/F 103 is an interface with an external apparatus. The external apparatus is a recording medium 103*a* or the like. With this, the computer 100 can read information from the recording medium 103*a* and/or write information to the recording medium 103*a* through the external I/F 103. The recording medium 103*a* is a flexible disk, a CD, a DVD, an SD memory card, a USB memory, or the like.

The ROM 105 is a non-volatile semiconductor memory (a memory device), which can hold a program and/or data even when a power source is powered off. The ROM 105 stores programs and data such as a basic input/output system (BIOS), an OS setup, a network setup, or the like, which are executed at a time of booting up the computer 100. The RAM 104 is an example of a volatile semiconductor memory (a memory device) temporarily storing the program and/or the data.

The CPU 106 reads the program and/or the data from the memory device such as the ROM 105, the HDD 108, or the like. The read program or the read data undergo the process to thereby substantialize controls or functions of the entire computer 100.

The meeting server 10 and the client terminal 12 can substantialize various processes described below by executing the program in the computer 100 having the above-described hardware structure.

<Software Structure>

The meeting server 10 and the client terminal 12 of the meeting system 1 of the embodiment are substantialized by a function block described below.

<<Meeting Server>>

Figure 3:
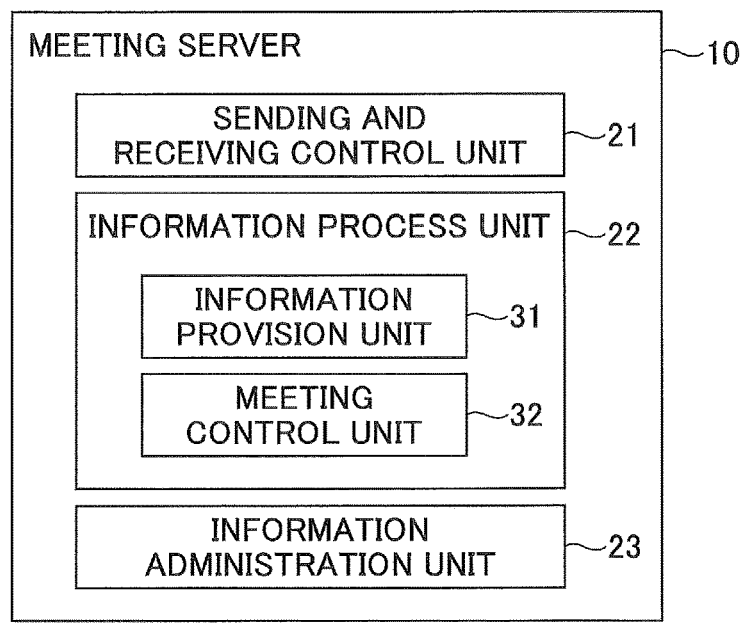
FIG. 3 is an exemplary functional block chart of a meeting server.

The meeting server 10 is substantialized by, for example, a function block illustrated in FIG. 3. FIG. 3 is an exemplary functional block chart of the meeting server. Meanwhile, the function block illustrates functions necessary for the explanation of the embodiment from among functions provided by the meeting server 10. Another function may further exist.

The meeting server 10 substantializes (implements) a sending and receiving control unit 21, an information process unit 22, and an information administration unit 23. The information process unit 22 includes an information provision unit 31 and a meeting control unit 32.

The sending and receiving control unit 21 controls communications with the client terminal 12. The information process unit 22 performs information processing of the information provision unit 31, the meeting control unit 32, and so on. The information administration unit 23 stores a meeting information table, a material information table, material data, and so on.

The information provision unit 31 provides meeting information, agenda information, and material information to the client terminal 12 in response to an information acquisition request received from the client terminal 12. The meeting control unit 32 controls to provide the material, open or end the meeting, and share a display screen in the client terminal 12 participating in the meeting using information such as the meeting information, the agenda information, and the material information, which are stored in the information administration unit 23.

<<Client Terminal>>

Figure 4:
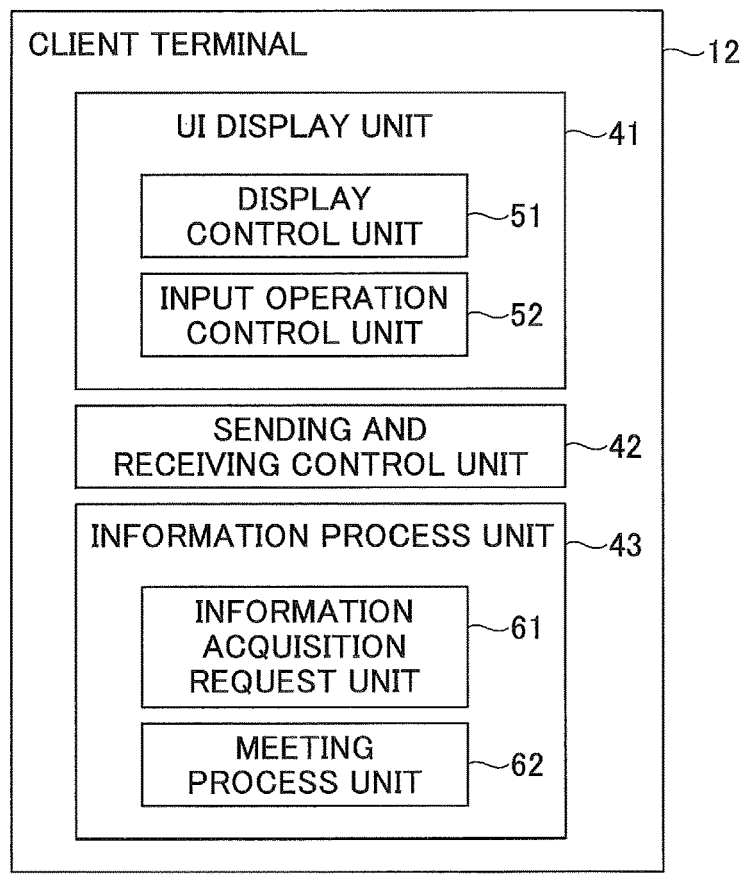
FIG. 4 is an exemplary function block chart of a client terminal.

The client terminal 12 is substantialized by, for example, a function block illustrated in FIG. 4. FIG. 4 is an exemplary function block chart of the client terminal. Meanwhile, the function block illustrates functions necessary for the explanation of the embodiment from among functions provided by the client terminal 12. Another function may further exist.

The client terminal 12 substantializes (implements) an UI display unit 41, a sending and receiving control unit 42, and an information process unit 43 by executing a program. Further, the UI display unit 41 includes a display control unit 51 and an input operation control unit 52. Further, the information process unit 43 includes an information acquisition request unit 61 and a meeting process unit 62.

The UI display unit 41 controls a display control unit 51 and an input operation control unit 52 so as to perform a UI display. The sending and receiving control unit 42 controls communications with the meeting server 10. The information process unit 43 performs information processing for the information acquisition request unit 61, the meeting process unit 62, and so on.

The display control unit 51 performs a display control of the UI. The input operation control unit 52 receives an input operation from the user and controls based on the input operation. The information acquisition request unit 61 sends an acquisition, request to acquire the meeting information, the agenda information, and the material information to the meeting server 10. The meeting process unit 62 performs a process for the meeting. For example, the meeting process unit 62 communicates with the meeting server 10 using the sending and receiving control unit 42 so as to share display screens of the agenda view and the material with the other client terminal 12.

The function blocks illustrated in FIGS. 3 and 4 are an example. For example, a part of the function block of the meeting server 10 illustrated in FIG. 3 may be operated in the other information processing apparatus. In this case, if necessary, the function blocks mutually communicate to exchange information.

<<Meeting Information Table>>

The information administration unit 23 stores a meeting information table, illustrated in, for example, FIG. 5. FIG. 5 illustrates an exemplary structure of the meeting information table. In the meeting information table illustrated in FIG. 5, meeting information related to the meeting is described.

Item names of the meeting information table are a meeting ID, a meeting name, an open date, a meeting state, and whether the agenda exists or not. The meeting ID is exemplary identification information uniquely identifying the meeting. The meeting name is the name of the meeting. The open date is a date when the meeting is opened. The meeting state indicates states the meeting such as "before open", "ongoing", and "after open". The "whether agenda exist or not" indicates whether an agenda for the meeting is registered.

<<Agenda Information Table>>

The information administration unit 23 stores an agenda information table, illustrated in, for example, FIG. 6. FIG. 6 illustrates an exemplary structure of the agenda information table. In the agenda information table illustrated in FIG. 6, the agenda information related to the agenda is described.

The items of the agenda information table illustrated in FIG. 6 include an agenda ID, a meeting ID, an agenda name, a presenter, a presentation time, or the like. The meeting ID is exemplary identification information uniquely identifying the meeting. The meeting ID is exemplary identification information uniquely identifying the meeting. By the meeting ID, each record of the agenda information table is associated with the meeting information illustrated in FIG. 5. The agenda name indicates the name of the agenda. The presenter indicates the name of the presenter associated with the agenda. The presentation time indicates a presentation time associated with the agenda.

<<Material Information Table>>

The information administration unit 23 stores a material information table, illustrated in, for example, FIG. 7. FIG. 7 illustrates an exemplary structure of the material information table. In the material information table illustrated in FIG. 7, the material information related to the material is described.

The items of the material information table illustrated in FIG. 7 are a material ID, an agenda ID, a meeting ID, a material name, a storing location, and so on. The material ID is exemplary identification information uniquely identifying the material. The agenda ID is exemplary identification information uniquely identifying the agenda. The meeting ID is exemplary identification information uniquely identifying the meeting. By the agenda ID and the meeting ID, each record of the material information table are associated with the meeting information illustrated in FIG. 5 and the agenda information illustrated in FIG. 6.

The material name indicates the name of the material. The storing location is exemplary information of a place where an entity (material data) of the material is stored. In the exemplary material information table illustrated in FIG. 7, the information of the location where the material data is stored. However, the material data itself may be stored. Regarding the record identified by a material ID of "γ" illustrated in FIG. 7, the agenda ID is blanked. In this case, the material is not registered in association with the agenda but is registered in association with the meeting.

Regarding the record identified by a material ID of "α" illustrated in FIG. 7, the material is registered in association with the agenda identified by the agenda ID of "AAA". Regarding the record identified by a material ID of "β." illustrated in FIG. 7, the material is registered in association with the agenda identified by the agenda ID of "AAA". As described above, in the meeting system 1 of the embodiment, the material is registered in association with not only the meeting but also the agenda registered in the meeting.

<Detailed Process>

Hereinafter, a detailed process of the meeting system 1 of the embodiment is described.

<<Meeting Participation Process>>

The participant or presenter of the meeting starts up the client terminal 12 and requests to access a meeting participation screen 1000 illustrated in, for example, FIG. 8. Then, the client terminal 12 of the participant or presenter accesses the URL of the meeting participation screen 1000 of the meeting server 10 or the like.

The web browser of the client terminal 12 or the application of the client terminal 12 may access the meeting participation screen 1000. When the web browser of the client terminal 12 accesses the meeting participation screen 1000, screen information of the meeting participation screen 1000 is displayed on the display region of the application.

The information provision unit 31 of the meeting server 10 sends the screen data of the meeting participation screen 1000 to the client terminal 12 of the participant or presenter based on an access of the participant or presenter performed from the client terminal 12.

The display control unit 51 of the client terminal 12 causes the meeting participation screen 1000 illustrated in FIG. 8 to be displayed on the display device 102 or the like based on the screen data of the meeting participation screen 1000 which is received from the meeting server 10.

FIG. 8 illustrates an exemplary image of the meeting participation screen. The meeting participation screen 1000 includes a field where the meeting view is displayed. In the exemplary meeting participation screen 1000 illustrated in FIG. 8, the meeting view of the meetings having meeting IDs of "M01" to "M04".

The participant or presenter of the meeting selects a meeting among the meetings in the meeting view and pushes a "participation" button 1001 at a lower part of the meeting participation screen 1000. The client terminal 12 starts a participation process for participating in the meeting selected by the participant or presenter. Described next is a meeting participation process for participating in a meeting having an agenda registered to the meeting.

FIG. 9 is an exemplary flow chart of the meeting participation process. In step S11, the information acquisition request unit 61 of the client terminal 12 designates the meeting ID of the meeting selected on the meeting participation screen 1000 and sends an acquisition request to acquire the agenda information to the meeting server 10. The information provision unit 31 of the meeting server 10 reads the agenda information associated with the designated meeting ID from the agenda information table and provides the read agenda information to the client terminal 12, which is the acquisition request source.

Further, in step S12, the information acquisition request unit 61 of the client terminal 12 sends an acquisition request to acquire the material information to the meeting server 10 by designating the meeting ID of the meeting selected on the meeting participation screen 1000 and the agenda ID of the agenda information acquired in step S11. The information provision unit 31 of the meeting server 10 reads the designated meeting ID and the material information associated with the designated meeting ID from the material information table and provides the read material information to the client terminal 12, which is the acquisition request source.

In step S13, the information acquisition request unit 61 of the client terminal 12 designates the meeting ID of the meeting selected on the meeting participation screen 1000 and sends an acquisition request to acquire the display information to the meeting server 10. Here, the display information is information of the display screen (the agenda view screen, the material screen, or the like) shared in the meeting selected from the meeting participation screen 1000 and information of an item (the agenda or the like) selected on the display screen. Further, the display information may contain information of a content (a handwritten memo or the like) described on the display screen. By acquiring the display information, even in a case where the client participates in an ongoing meeting, the display control unit 51 of the client terminal 12 can display the agenda view screen and the material screen, which are shared in the meeting.

In step S14, the display control unit of the client terminal 12 determines whether the agenda view screen is being displayed in the meeting based on the display information acquired in step S13. In a case where the agenda view screen is being displayed, the display control unit 51 of the client terminal 12 displays the agenda view screen 1100 illustrated in FIG. 10 based on the acquired agenda information and the acquired material information, in step S15.

Figure 10:
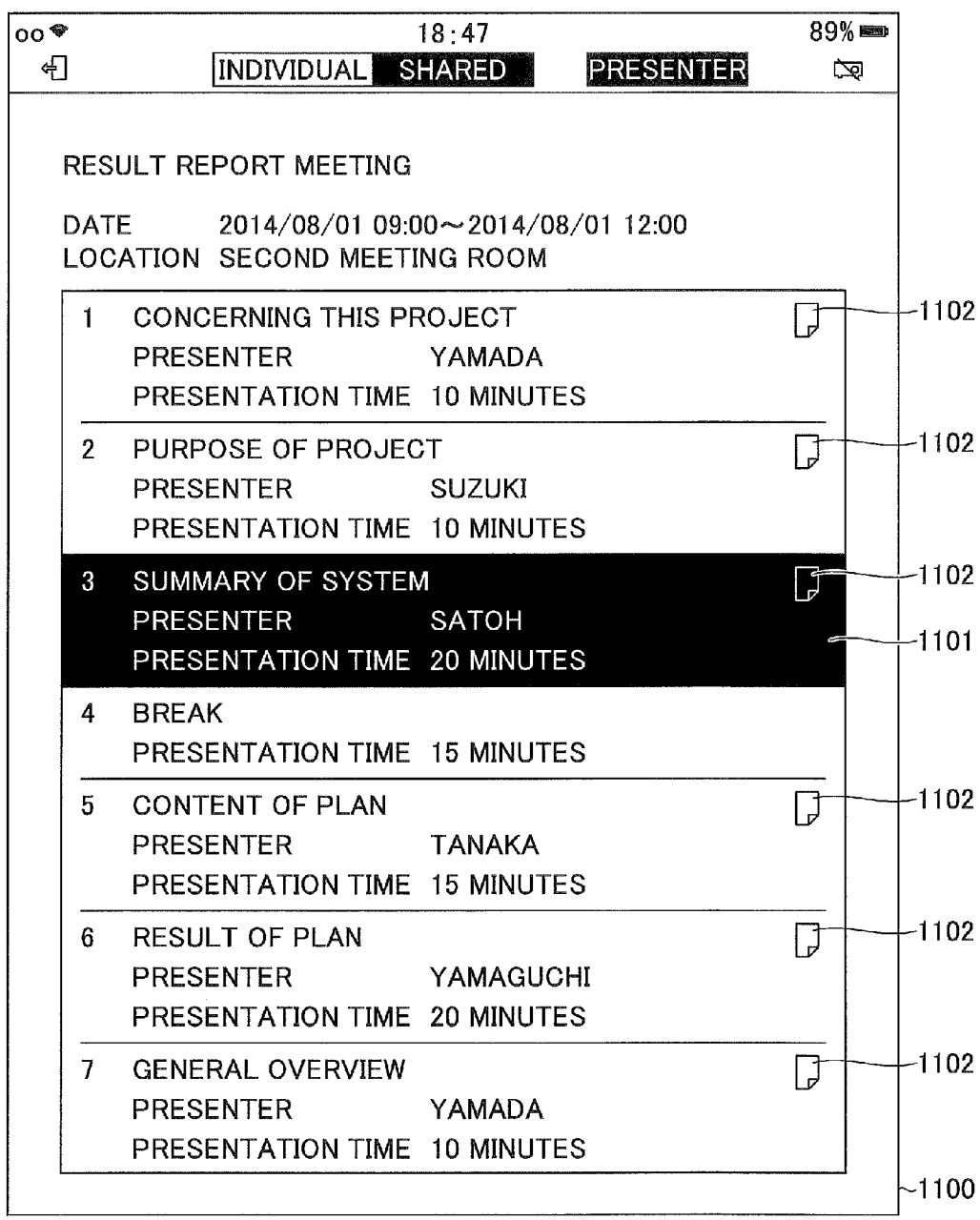
FIG. 10 is an exemplary image chart of an agenda view screen.

FIG. 10 is an exemplary image chart of the agenda view screen 1000. The agenda view screen 1100 illustrated in FIG. 10 is an example where seven agendas are registered in the meeting whose meeting name is a "result report meeting". A material mark 1102 is displayed on the agenda having the material registered in the agenda. Referring to FIG. 10, an agenda 1101 being selected by the presenter is displayed by adding a color, a shade, a flicker, or the like on the agenda view screen 1100 so as to visually differentiate the selected agenda 1101 from the other agendas. The agenda 1101 being selected by the presenter may be indicated by a character or an icon.

Further, in the agenda view screen 1100 illustrated in FIG. 10, the agenda 1101 being selected by the presenter is displayed in the vicinity of the center of the agenda view. In the agenda view screen 1100 illustrated in FIG. 10, the agenda view is arranged in a portrait orientation (a longitudinal direction) of the client terminal 12.

Figure 11:
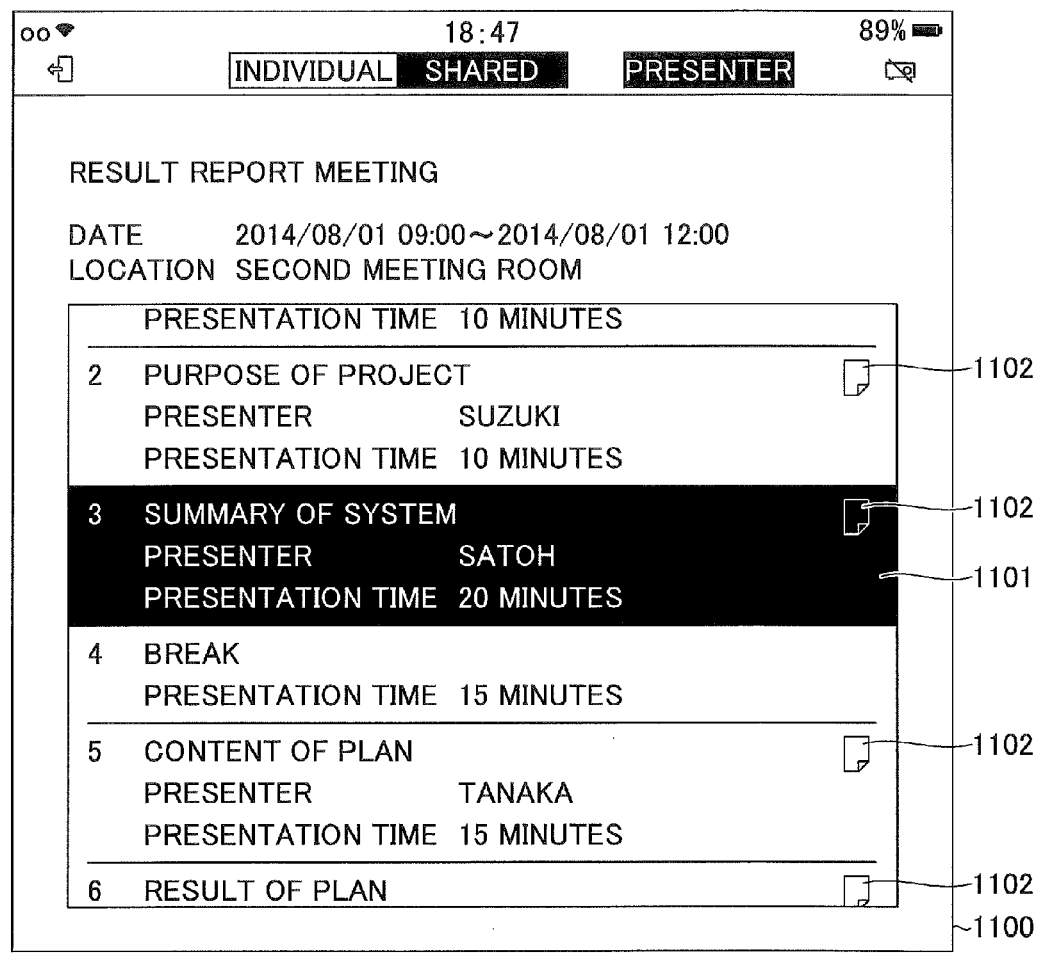
FIG. 11 illustrates another exemplary image of the agenda view screen.

In a case where the agenda view is displayed in a landscape orientation (a lateral direction) of the client terminal 12, the agenda view screen 1100 is displayed as illustrated in, for example, FIG. 11. FIG. 11 illustrates another exemplary image of the agenda view screen. In the agenda view screen 1100 illustrated in FIG. 11, because the agenda view is displayed in the landscape orientation (the lateral direction) of the client terminal 12, the number of the displayed agendas is smaller than that in the agenda view screen 1100 illustrated in FIG. 10.

After the agenda view screen 1100 is displayed, the presenter and the participant can freely scroll the agenda view screen 1100. Therefore, the presenter and the participant can freely check the agenda of the meeting, and the presenter can know the agenda 1101 being selected and the agenda view of the entire meeting. A scroll operation on the agenda view screen 11 performed by the presenter does not influence a display on the client terminal 12 of the presenter. As described, in the meeting system 1 of the embodiment, the scroll operation performed on the agenda view screen 1100 is not shared, and each of the client terminals 12 can individually perform the scroll operation.

Figure 12:
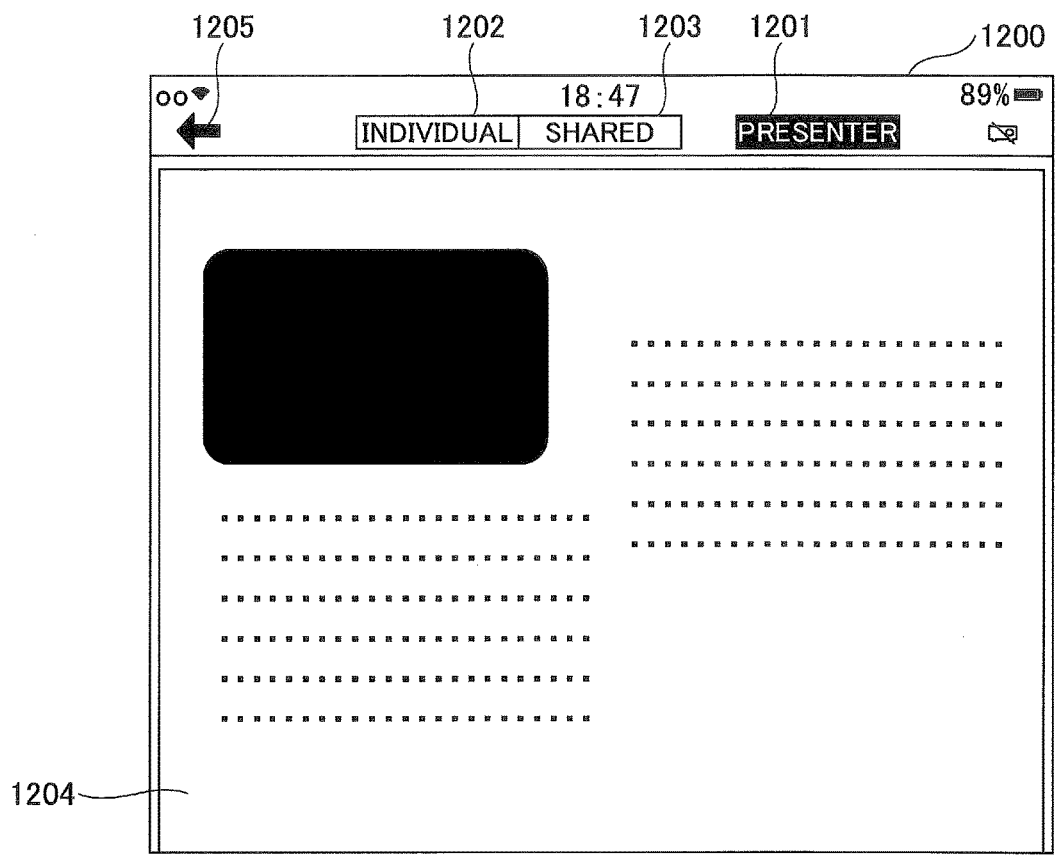
FIG. 12 is an exemplary image chart of a material screen.

In a case where the agenda view screen is not being displayed, the display control unit 51 of the client terminal 12 displays the material screen illustrated in FIG. 12 based on the acquired agenda information and the acquired material information, which are acquired in step S16, in step S14.

FIG. 12 illustrates an exemplary image of the material screen. The material screen 1200 illustrated in FIG. 12 is an example where a current page of a material 1204 associated with the agenda is being displayed. The material screen 1200 is displayed when the presenter performs an operation of selecting the agenda, on which the material mark 1102 is displayed, from the agenda view screen 1100.

On the material screen 1200, an individual mode button 1202, a shared mode button 123, and a presenter button 1201 are displayed. The individual mode button 1202 is provided to select an unshared mode in which a synchronous display is not performed. The shared mode button 1203 is provided to select a shared mode, in which the synchronous display is performed. The presenter button 1201 is provided to be the presenter. Further, the material screen 1200 includes a "return" button for returning to the agenda view screen 1100.

Figure 13:
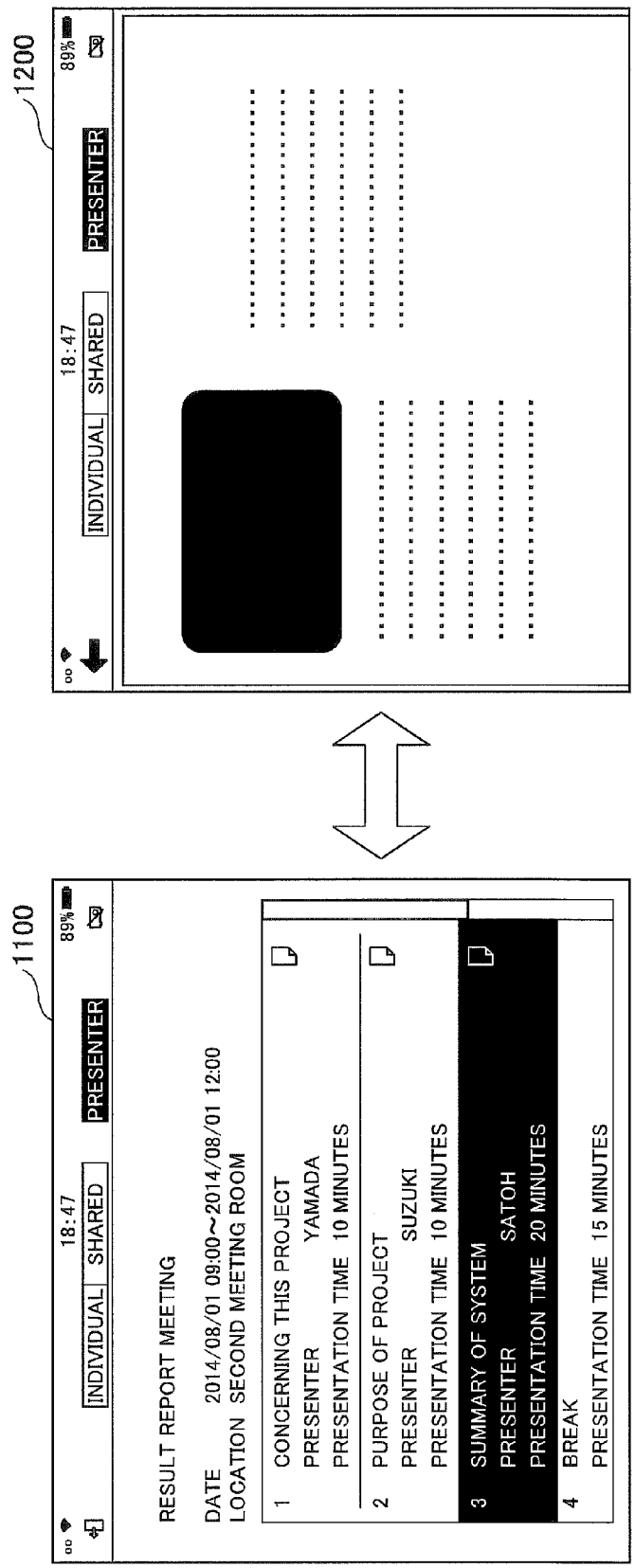
FIG. 13 illustrates an example of a transition between the agenda view screen and the material screen.

As such, the presenter operates the client terminal 12 so that the agenda view screen 1100 and the material screen 1200 can transit each other as illustrated in FIG. 13. The transition between the agenda view screen 1100 and the material screen 1200, which are displayed in the client terminal 12 of the presenter, are synchronously displayed in the client terminal 12 of the participant.

The client terminal 12 of the presenter sends the agenda ID of the agenda selected by the meeting server 10 when the client terminal 12 receives an operation of selecting the agenda, on which the material mark is displayed, from the presenter. The meeting server 10 sends the received agenda ID to the client terminal 12 of the participant who is participating in the meeting. Therefore, the client terminal 12 of the participant can perform the shared display of the material screen 1200 associated with the agenda (illustrated in FIG. 12) so as to be shared with the client terminal 12 of the presenter.

Further, when the client terminal 12 of the presenter receives an operation of returning from the material screen 1200 to the agenda view screen 1100 from the presenter, the client terminal 12 of the presenter reports the operation of returning from the material screen 1200 to the agenda view screen 1100 to the meeting server 10. The meeting server 10 reports the operation of returning from the material screen 1200 to the agenda view screen 1100 to the client terminal 12 being participating in the meeting. Therefore, the client terminal 12 of the participant can perform the shared display of the agenda view screen 1100 (illustrated in FIGS. 11 and 12 so as to be shared with the client terminal 10 of the presenter.

In the meeting system 1 of the embodiment, the transition from the agenda view screen 100 to the material screen 1200 associated with the agenda makes it easy for the presenter and the participant to understand the agenda whose material is being displayed.

Figure 14:
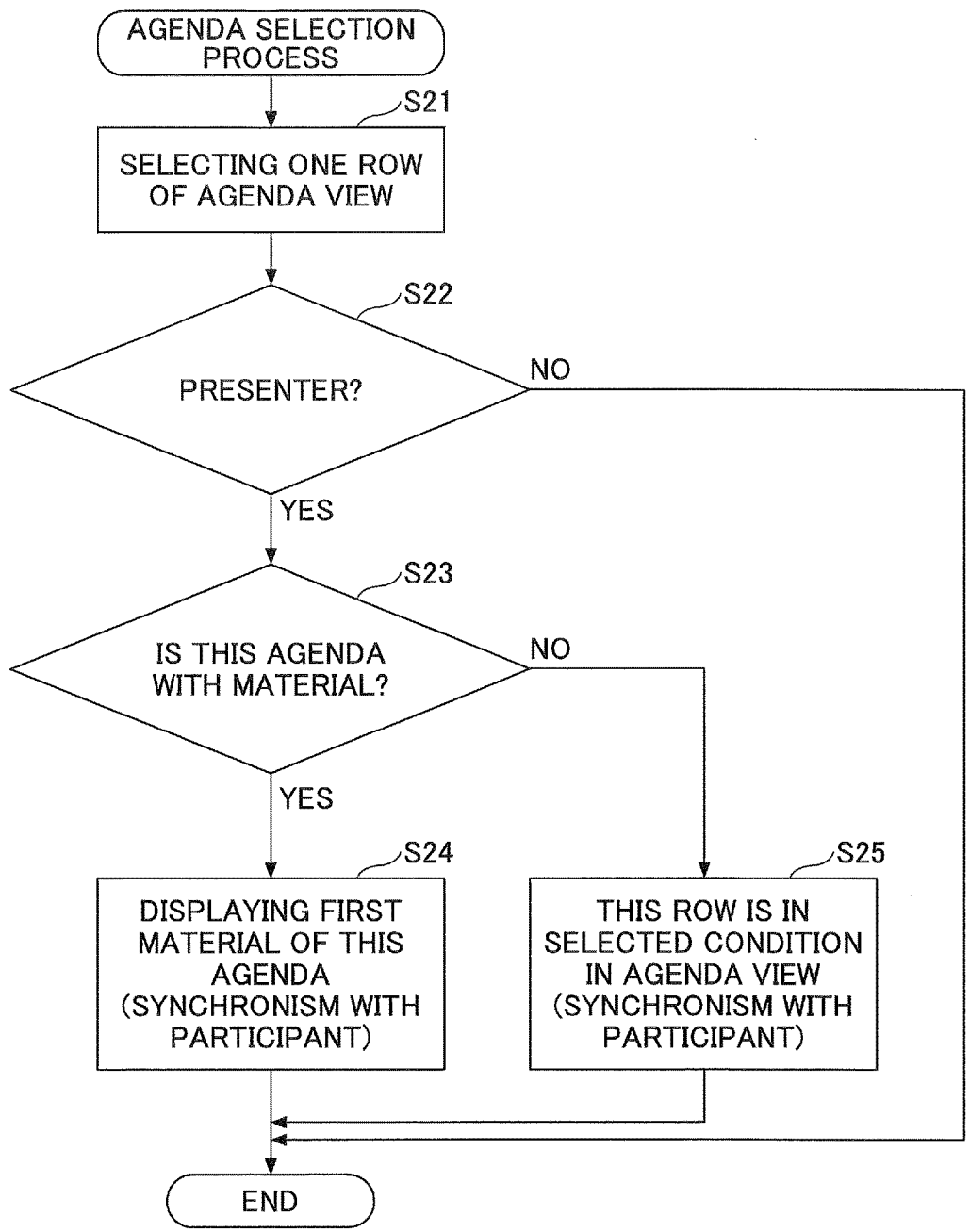
FIG. 14 is an exemplary flowchart representing a process in a case where an operation of selecting an agenda.

FIG. 14 is an exemplary flowchart representing a process in a case where the operation of selecting the agenda. In step S21, the input operation control unit 52 of the client terminal 12 receives an operation of selecting the agenda from the agenda view by the presenter or the participant. In step S22, the display control unit 51 determines whether the operation of selecting the agenda from the agenda view is done by the presenter or the participant. In a case where it is determined that the operation of selecting the agenda from the agenda view is done by the participant, the process of the flowchart illustrated in FIG. 14 ends.

In a case where it is determined that the operation of selecting the agenda from the agenda view is done by the presenter, the process goes to step S23. In step S23, it is determined whether the agenda selected in step S21 has a material registered in the agenda (whether it is the agenda with the material). If it is the agenda with the material, the display control unit 51 goes to step S24. Here, the first material of the selected agenda is displayed based on the material information associated with the agenda ID of the selected agenda. The meeting process unit 62 sends the agenda ID of the selected agenda to the meeting server 10. The meeting server 10 sends the received agenda ID to the client terminal 12 of the participant participating in the meeting so as to enable the client terminal 12 to display the first material of the selected agenda.

If it is not the agenda with the material, the display control unit 51 goes to step S25. Here, the agenda selected by the presenter is visually differentiated from the other agenda on the agenda view screen 1100. The meeting process unit 62 sends the agenda ID of the selected agenda to the meeting server 10. The meeting server 10 sends the received agenda ID to the client terminal 12 of the participant participating in the meeting so as to enable the client terminal 12 of the participant to display while the agenda selected by the presenter is in a selected state.

Figure 15:
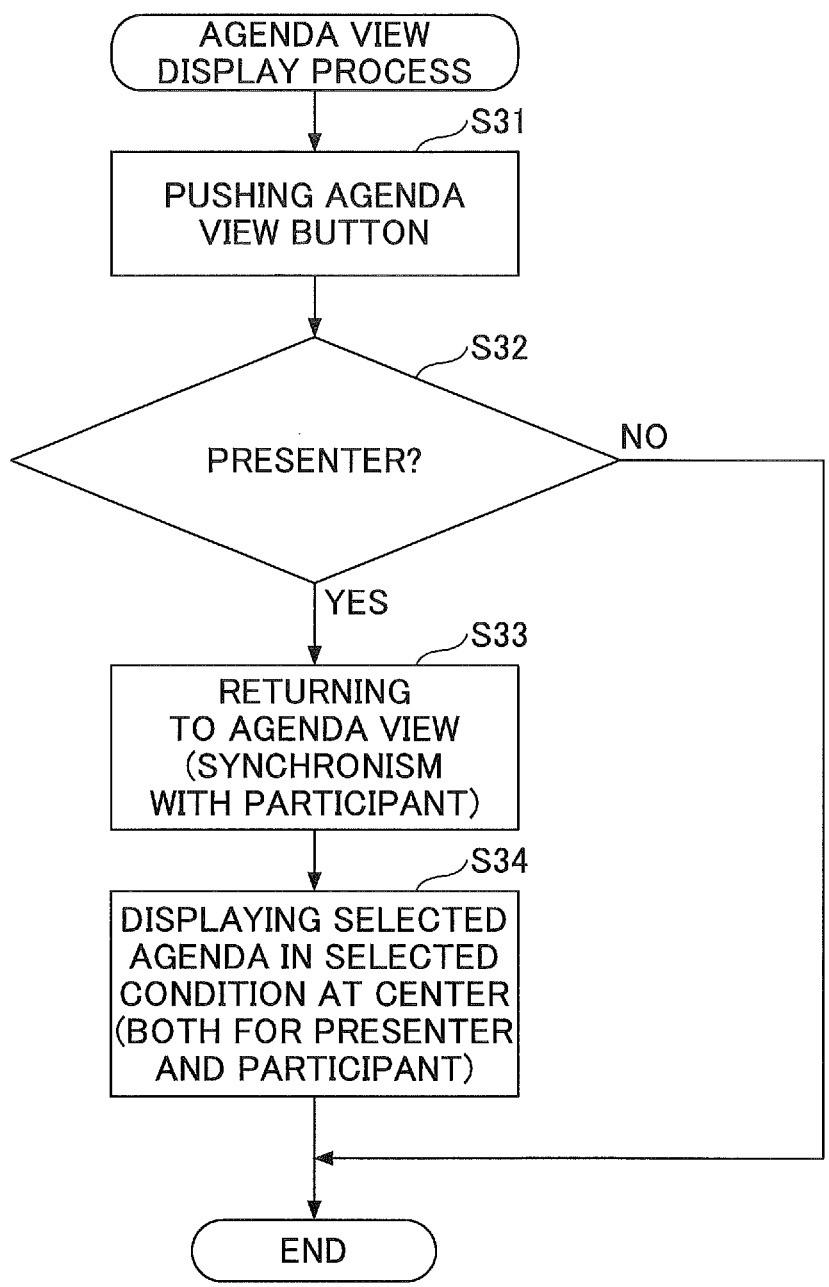
FIG. 15 is an exemplary flowchart representing a process in a case where an operation of returning to an agenda view is received.

FIG. 15 is an exemplary flowchart representing a process in a case where the operation of returning to the agenda view is received. In step S31, the input operation control unit 52 of the client terminal 12 receives an operation of returning to the agenda view by the presenter or the participant. In step S32, the display control unit 51 determines whether the operation of returning to the agenda view is done by the presenter or the participant. In case where it is determined that the operation of returning to the agenda view is done by the participant, the display control unit 51 ends the process of the flowchart illustrated in FIG. 15.

In case where it is determined that the operation of returning to the agenda view is done by the presenter, the agenda view screen 1100 is displayed again. The meeting process unit 62 reports the operation of returning back to the agenda view to the meeting server 10. When the meeting server 10 reports the operation of returning back to the agenda view to the client terminal 12 of the participant, the display of the client terminal 12 of the participant can be returned to the agenda view.

In step S34, the display control units 51 of the client terminals 12 of the presenter and the participant control to display the agenda view screen 1100 so that the selected agenda 1101 is displayed in the vicinity of a center of the agenda view while the selected agenda 1101 is being selected. Therefore, the display control units 51 of the client terminals 12 of the presenter and the participant make it easy to select the next agenda or to change the presenter.

According to the meeting system 1 of the embodiment, the display screen can be shared by delivering the input operation performed by the presenter from the meeting server 10 to the client terminal 12 of the participant. For example, the meeting server 10 and the client terminal 12 send and receive information necessary to share the agenda view screen 1100 and the material screen 1200 using an established communication path. An example of the communication path is a protocol called XMPP.

XMPP is standardized in IETF as RFC3920 (Extensible Messaging and Presence Protocol: Core), and RFC3921 (Extensible Messaging and Presence Protocol: Instant Messaging and Presence). Extended specifications are documented as XEP.

XMPP can provide a service called "group chat (Multi-User Chat [XEP-0045])". The group chat is a function of delivering a message, which is sent from the client terminal 12 participating in a meeting room (room) provided by XMPP to the meeting server 10, from the meeting server 10 to all client terminals 12 participating in the meeting room. The communication path may be established not only by XMPP but also by protocols such as BOSH, WebSocket, or Commet.

In the XMPP, there is a technique called a Bidirectional-streams Over Synchronous HTTP (BOSH) for sending and receiving messages of HTTP. These protocols can substantialize a Push function from the meeting server 10. The Push function is to asynchronously send information from the meeting server 10 to the client terminal 12 and receive the information by the client terminal 12 without sending the information upon a request sent from the client terminal 12. In an ordinary HTTP communication, a function similar thereto can be substantialized by periodically fetching the information by the client terminal 12.

FIG. 16 explains an exemplary display synchronization in an agenda view screen. Referring to FIG. 16, the display screen of the client terminal 12 of the presenter is illustrated on the left side, and the display screen of the client terminal 12 of the participant is illustrated on the right side.

FIG. 16, at (A), illustrates the agenda view screen 1100 displayed by the client terminal 12 of the presenter and the participant. In the agenda view screen illustrated in FIG. 16, at (A), the same agendas 1101 selected by the presenter are in selected states. However, the agenda views shift between the right and left sides by a scroll operation by the presenter or the participant.

FIG. 16, at (B), illustrates the material screen 1200 displayed by the client terminal 12 of the presenter and the participant. The material screen 1200 illustrated in FIG. 16, at (B), is displayed when the presenter selects an agenda with a material in FIG. 16, at (A). The client terminal 12 of the presenter and the participant synchronously display the material screen 1200 of the material associated with the agenda selected from the agenda view screen illustrated in FIG. 16, at (A).

FIG. 16, at (C), illustrates the agenda view screen 1100 displayed by the client terminal 12 of the presenter and the participant in a case where the material screen illustrated in FIG. 16, at (B) returns to the agenda view. As illustrated in FIG. 16, at (C), in a case where the screen is returned from the material screen 1200, selected states of the agenda and scrolls (positions) on the agenda view screens 1100 displayed by the client terminal 12 of the presenter and the participant are synchronized. Referring to FIG. 16, at (C), selected agendas 1101 are displayed in the vicinity of the centers of the agenda views on the agenda view screens 1100 displayed in the client terminals 12 of the presenter and the participant, respectively.

FIG. 17 illustrates a case where the selected states of the agenda and the scrolls (the positions) of the agenda view screens 1100 synchronize. FIG. 17 explains an exemplary case where the selected states of the agenda and the scrolls (the positions) of the agenda view screens synchronize.

The case where the selected states of the agenda and the scrolls (the positions) of the agenda view screens synchronize is a case where agenda views are displayed at a time of participating in the meeting or a case where agenda views are displayed in a shared mode at a time of switching from an unshared mode to the shared mode. Further, the case where the selected states of the agenda and the scrolls (the positions) of the agenda view screens synchronize is a case where an agenda view is displayed at a time of acquiring an authority as a presenter is acquired or a case where a screen transits from a different screen (i.e., the material screen or a setup screen) to the agenda view screen 1100. Furthermore, the case where the selected states of the agenda and the scrolls (the positions) of the agenda view screens synchronize may be a case where the scroll is forcibly done so that a presenter shows an agenda to a participant.

[General Overview]

According to a meeting system 1 of the embodiment, in the synchronous display of the agenda view screens in the client terminals 12, the case where the scroll operations synchronize is determined and other scroll operations can be freely performed in a case other than the case where the scroll operations synchronize. The presenter and the participant can know the agendas of the entire meeting by individually scrolling the agenda view on the agenda view screen 1100 while recognizing the progress of the meeting in the shared mode.

In the meeting system 1 of the embodiment, operability for the presenter or the participant can be improved in the client terminal 12 performing the screen sharing.

For example, in the meeting system 1 of the embodiment, a scroll operation on the agenda view screen 1100 can be individually performed even in the shared mode. Further, because it is the shared mode, the meeting system 1 can synchronize displays on the client terminals 12 of the presenter and the participant in a case where the screen transits to the material screen 1200 or in a case where the agenda is selected on the agenda view screen 1100.

Within the embodiment, the meeting system 1 is exemplified. However, the present invention is applicable to another system of displaying a view screen of information such as a lecture or a lesson and a material screen of a material associated with the information such as a seminar system or an education system.

Within the embodiment, the scroll operation on the agenda view screen 1100 is exemplified. However, the present invention is applicable to an operation on a view screen of information where a synchronous display is required to be performed or not to be performed depending on a condition (a timing).

For example, the client terminal 12 is an example of a terminal apparatus recited in claims. The meeting server 10 is an example of a screen sharing administration apparatus recited in the claims. The agenda view screen 1100 is an example of a view screen of information recited in the claims.

The input operation control unit 52 is an example of an operation receiving unit recited in the claims. The material screen 1200 is an example of a material screen associated with the information recited in the claims. The display control unit 51 is an example of a display control unit recited in the claims. The agenda information is an example of information administering a progress status in the claims.

The meeting system 1 including the meeting server 10 and one or more client terminals 12 is an example. Various examples of a system structure may be applicable depending on a use or a purpose.

As described, according to the embodiment of the present invention, it is possible to improve an operability in multiple terminal apparatuses performing screen sharing.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although a terminal apparatus has been described in detail, it should be understood that various changes, substitutions, and alterations could be made thereto without departing from the spirit and scope of the invention.

This application is based upon and claims the benefit of priority of the prior Japanese Patent Application No. 2014-171229, filed on Aug. 26, 2014, the entire contents of which are incorporated herein by reference.

What is claimed is:

1. A terminal apparatus that shares a list screen of information items and a material screen associated with each of presentation topics with another terminal apparatus, the terminal apparatus comprising:
  a processor that is configured to:
    receive an operation of the list screen or the material screen from a user; and
    control a display so as to share a screen that displays the list screen with the another terminal apparatus based on the operation of the list screen or the material screen when the user has an authority,
  wherein the processor is further configured to control to prevent from reflecting a predetermined action of the user at the terminal to the list screen of the another terminal apparatus while sharing the list screen with the another terminal apparatus, said predetermined action being executed at each terminal apparatus and including a scrolling action in the list screen at the each terminal apparatus,
  wherein, when the presentation topic is selected in the list screen at an terminal apparatus by the user who has the authority, the processor is further configured to start sharing a material screen associated with the selected presentation topic with the another terminal apparatus, and
  wherein a transition between the list screen and the material screen that are displayed in the terminal of the presenter is synchronously displayed in the another terminal apparatus.

2. The terminal apparatus according to claim 1,
  wherein the processor is further configured to control the display to the list screen so as to share the screen with the another terminal apparatus at a timing of receiving the operation of the display from the material screen to the list screen.

3. The terminal apparatus according to claim 1,
  wherein the processor is further configured to control a display of the list screen so as to share the screen with the another terminal apparatus of the user having the authority at a timing of receiving the operation of starting to share the screen with the another terminal apparatus.

4. The terminal apparatus according to claim 1,
  wherein the processor is further configured to perform a shared mode, in which the screen is shared with the another terminal apparatus, and an unshared mode, in which the screen is not shared with the another terminal apparatus, and control to display the list screen so as to share the screen with the terminal apparatus of the user having the authority at a timing of switching from the unshared mode to the shared mode.

5. The terminal apparatus according to claim 1,
  wherein the processor is further configured to control to display the list screen so as to share the screen with the another terminal apparatus at a timing when the user acquires the authority.

6. The terminal apparatus according to claim 1,
  wherein the processor is further configured to control to display the list screen of agenda information, which is provided to administer a progress status of a meeting, displayed in the another terminal so that the agenda information selected by the user having the authority is displayed on the list screen of the agenda information of the terminal apparatus.

7. The terminal apparatus according to claim 1,
  wherein the processor is further configured to control to display a scroll operation on the list screen without sharing the screen with the another terminal apparatus regardless of whether the user has the authority in response to the scroll operation.

8. The terminal apparatus according to claim 1,
  wherein the user having the authority is a presenter in a meeting.

9. The terminal apparatus according to claim 1,
wherein the processor is further configured to send a request for information of the list screen that is identified by meeting identification information that is selected by the terminal apparatus to a screen sharing administration apparatus configured to administrates the screen sharing performed in the plurality of terminal apparatuses and receive the list screen that is associated with the meeting identification information from the screen sharing administration apparatus.

10. The terminal apparatus according to claim 9,
wherein the processor is further configured to send a request for information of the material screen that is identified by the meeting identification information and identification information of the list screen that is selected by the terminal apparatus to the screen sharing administration apparatus and receive the meeting identification information and the material screen that is associated with the meeting identification information from the screen sharing administration apparatus.

11. The terminal apparatus according to claim 1, wherein the predetermined action includes a scrolling in the list screen.

12. The terminal apparatus according to claim 1, wherein the processor is further configured to share the list screen with the another terminal apparatus while not affecting a shared list screen of the another terminal apparatus by the scrolling when the user performs the scrolling.

13. The terminal apparatus according to claim 1,
wherein the list screen includes a time allotted for each of the presentation topics to be given at a meeting and a tab for generating the material screen of each of the presentation topics, and
wherein the material screen includes a tab to become a presenter of the material screen, the material screen being shared with the another terminal apparatus based on an operation of the presenter.

14. A screen sharing method of sharing a screen by a terminal apparatus that shares a list screen of information items and a material screen associated with each of presentation topics with another terminal apparatus, the screen sharing method comprising:
receiving an operation of the list screen or the material screen from a user;
controlling a display so as to share a screen that displays the list screen with the another terminal apparatus based on the operation of the list screen or the material screen when the user has an authority,
wherein the controlling controls to prevent from reflecting a predetermined action of the user at the terminal to the list screen of the another terminal apparatus while sharing the list screen with the another terminal apparatus, said predetermined action being executed at each terminal apparatus and including a scrolling action in the list screen at the each terminal apparatus,
wherein, when the presentation topic is selected in the list screen at an terminal apparatus by the user who has the authority, the screen sharing method further comprises starting sharing a material screen associated with the selected presentation topic with the another terminal apparatus, and
wherein a transition between the list screen and the material screen that are displayed in the terminal of the presenter is synchronously displayed in the another terminal apparatus.

15. The screen sharing method according to claim 14,
wherein the list screen includes a time allotted for each of the presentation topics to be given at a meeting and a tab for generating the material screen of each of the presentation topics,
wherein the material screen includes a tab to become a presenter of the material screen, and
wherein the method further comprising controlling the material screen to be shared with the another terminal apparatus based on an operation of the presenter.

16. A screen sharing system comprising:
a plurality of terminal apparatuses configured to implement a program to perform screen sharing of sharing a list screen of presentation topics and a material screen associated with each of the presentation topics;
a screen sharing administration apparatus configured to administrates the screen sharing performed in the plurality of terminal apparatuses; and
a network configured to connect the plurality of terminal apparatuses and the screen sharing administration apparatus so that the plurality of terminal apparatuses and the screen sharing administration apparatus mutually communicates,
wherein a terminal apparatus among the plurality of terminal apparatuses includes
a processor that is configured to:
receive an operation of the list screen or the material screen from a user, and
control a display so as to share a screen that displays the list screen with the another terminal apparatus among the plurality of terminal apparatuses based on the operation of the list screen or the material screen when the user has an authority,
wherein the processor that is configured to control to prevent from reflecting a predetermined action of the user at the terminal to the list screen of the another terminal apparatus while sharing the list screen with the another terminal apparatus, said predetermined action being executed at each terminal apparatus and including a scrolling action in the list screen at the each terminal apparatus,
wherein, when the presentation topic is selected in the list screen at an terminal apparatus by the user who has the authority, the screen sharing method further comprises starting sharing a material screen associated with the selected presentation topic with the another terminal apparatus, and
wherein a transition between the list screen and the material screen that are displayed in the terminal of the presenter is synchronously displayed in the another terminal apparatus.

17. The screen sharing system according to claim 16,
wherein the list screen includes a time allotted for each of the presentation topics to be given at a meeting and a tab for generating the material screen of each of the presentation topics, and
wherein the material screen includes a tab to become a presenter of the material screen, the material screen being shared with the another terminal apparatus based on an operation of the presenter.

* * * * *

UNITED STATES PATENT AND TRADEMARK OFFICE
CERTIFICATE OF CORRECTION

| | |
|---|---|
| PATENT NO. | : 10,075,492 B2 |
| APPLICATION NO. | : 14/833239 |
| DATED | : September 11, 2018 |
| INVENTOR(S) | : Tomoko Kawakubo |

Page 1 of 1

It is certified that error appears in the above-identified patent and that said Letters Patent is hereby corrected as shown below:

On the Title Page

Please correct the Item (73): Assignee's name to "Ricoh Company, Ltd." from "Ricoh Company,"

Signed and Sealed this
Twelfth Day of February, 2019

Andrei Iancu
*Director of the United States Patent and Trademark Office*